(12) United States Patent
Atkinson, III et al.

(10) Patent No.: US 8,612,263 B1
(45) Date of Patent: Dec. 17, 2013

(54) SYSTEMS AND METHODS FOR PROVIDING A CASH VALUE ADJUSTMENT TO A LIFE INSURANCE POLICY

(75) Inventors: Landis W. Atkinson, III, Richmond, VA (US); Kevin G. Smith, Lynchburg, VA (US); Geoffrey S. Stiff, Richmond, VA (US)

(73) Assignee: Genworth Holdings, Inc., Richmond, VA (US)

( * ) Notice: Subject to any disclaimer, the term of this patent is extended or adjusted under 35 U.S.C. 154(b) by 871 days.

(21) Appl. No.: 12/339,822

(22) Filed: Dec. 19, 2008

Related U.S. Application Data (60) Provisional application No. 61/016,184, filed on Dec. 21, 2007.

(51) Int. Cl.
*G06Q 40/00* (2012.01)
(52) U.S. Cl.
USPC ............................................................ 705/4
(58) Field of Classification Search
USPC ............................................................ 705/4
See application file for complete search history.

(56) References Cited

U.S. PATENT DOCUMENTS

| | | | |
|---|---|---|---|
| 4,055,757 A | 10/1977 | Tillman et al. | |
| 4,742,457 A | 5/1988 | Leon et al. | |
| 4,750,121 A | 6/1988 | Halley et al. | |
| 4,876,648 A | 10/1989 | Lloyd | |
| 4,969,094 A | 11/1990 | Halley et al. | |
| 4,975,840 A | 12/1990 | DeTore et al. | |
| 5,291,398 A | 3/1994 | Hagan | |
| 5,523,942 A | 6/1996 | Tyler et al. | |
| 5,631,828 A | 5/1997 | Hagan | |
| 5,655,085 A * | 8/1997 | Ryan et al. | 705/4 |
| 5,673,402 A | 9/1997 | Ryan et al. | |
| 5,689,649 A | 11/1997 | Altman et al. | |
| 5,689,650 A | 11/1997 | McClelland et al. | |
| 5,696,907 A | 12/1997 | Tom | |

(Continued)

FOREIGN PATENT DOCUMENTS

| | | |
|---|---|---|
| EP | 0621556 | 10/1994 |
| WO | WO 98/22936 | 5/1998 |

(Continued)

OTHER PUBLICATIONS

Eileen Shovlin, "Clearing up common misconceptions about life settlements," Dec. 10, 2001, National Underwriter, vol. 105, Iss. 50., pp. 1-4.*

(Continued)

*Primary Examiner* — Kenneth Bartley
(74) *Attorney, Agent, or Firm* — Hunton & Williams LLP (57) ABSTRACT

A method and system for performing a cash value adjustment to a life insurance policy issued by an insurer and owned by a policy owner, the method performed by a computer processing system. The method may include (1) inputting parameters of a life insurance policy, the parameters including controlling parameters, and the controlling parameters including: (i) a constraint dictated parameter of the life insurance policy; and (ii) a driven parameter of the life insurance policy. The method may further include analyzing the relationship between the constraint dictated parameter and the driven parameter; and performing a re-underwriting of the life insurance policy using the parameters of the life insurance policy and a set of re-underwriting criteria. The method may further include generating re-underwritten policy data to constitute a re-underwritten policy. The method may include providing an annuity.

26 Claims, 6 Drawing Sheets

(56) References Cited

U.S. PATENT DOCUMENTS

| | | | |
|---|---|---|---|
| 5,732,397 A | 3/1998 | DeTore et al. | |
| 5,745,706 A | 4/1998 | Wolfberg et al. | |
| 5,752,236 A | 5/1998 | Sexton et al. | |
| 5,754,980 A | 5/1998 | Anderson et al. | |
| 5,806,047 A | 9/1998 | Hackel et al. | |
| 5,819,230 A | 10/1998 | Christie et al. | |
| 5,864,685 A | 1/1999 | Hagan | |
| 5,878,405 A | 3/1999 | Grant et al. | |
| 5,893,071 A | 4/1999 | Cooperstein | |
| 5,907,828 A | 5/1999 | Meyer et al. | |
| 5,911,135 A | 6/1999 | Atkins | |
| 5,913,198 A | 6/1999 | Banks | |
| 5,926,792 A | 7/1999 | Koppes et al. | |
| 5,930,760 A | 7/1999 | Anderton et al. | |
| 5,933,815 A | 8/1999 | Golden | |
| 5,946,668 A | 8/1999 | George | |
| 5,966,700 A | 10/1999 | Gould et al. | |
| 5,987,434 A | 11/1999 | Libman | |
| 5,995,947 A | 11/1999 | Fraser et al. | |
| 5,999,917 A | 12/1999 | Facciani et al. | |
| 6,012,043 A | 1/2000 | Albright et al. | |
| 6,014,632 A | 1/2000 | Gamble et al. | |
| 6,021,397 A | 2/2000 | Jones et al. | |
| 6,049,772 A | 4/2000 | Payne et al. | |
| 6,052,673 A | 4/2000 | Leon et al. | |
| 6,058,376 A | 5/2000 | Crockett | |
| 6,064,969 A | 5/2000 | Haskins | |
| 6,064,983 A | 5/2000 | Koehler | |
| 6,064,986 A | 5/2000 | Edelman | |
| 6,071,672 A | 6/2000 | Namba et al. | |
| 6,071,673 A | 6/2000 | Iguchi et al. | |
| 6,085,174 A | 7/2000 | Edelman | |
| 6,235,176 B1 | 5/2001 | Schoen et al. | |
| 6,275,807 B1 | 8/2001 | Schirripa | |
| 6,282,520 B1 | 8/2001 | Schirripa | |
| 6,304,859 B1 | 10/2001 | Ryan et al. | |
| 6,343,272 B1 | 1/2002 | Payne et al. | |
| 6,473,737 B2 | 10/2002 | Burke | |
| 6,584,446 B1 | 6/2003 | Buchanan et al. | |
| 6,592,030 B1 | 7/2003 | Hardesty | |
| 6,609,111 B1 | 8/2003 | Bell | |
| 6,611,807 B1 | 8/2003 | Bernheim et al. | |
| 6,611,808 B1 | 8/2003 | Preti et al. | |
| 6,611,815 B1 | 8/2003 | Lewis et al. | |
| 6,615,180 B1 | 9/2003 | Anderton et al. | |
| 6,625,582 B2 | 9/2003 | Richman et al. | |
| 6,636,834 B1 | 10/2003 | Schirripa | |
| 6,666,768 B1 | 12/2003 | Akers | |
| 6,671,677 B2 | 12/2003 | May | |
| 6,684,189 B1 * | 1/2004 | Ryan et al. | 705/4 |
| 6,684,190 B1 | 1/2004 | Powers et al. | |
| 6,947,904 B1 | 9/2005 | Macey | |
| 6,950,805 B2 | 9/2005 | Kavanaugh | |
| 6,963,852 B2 * | 11/2005 | Koresko | 705/35 |
| 6,999,935 B2 | 2/2006 | Parankirinathan | |
| 7,016,871 B1 | 3/2006 | Fisher et al. | |
| 7,039,593 B2 | 5/2006 | Sager | |
| 7,080,032 B2 | 7/2006 | Abbs et al. | |
| 7,089,201 B1 | 8/2006 | Dellinger et al. | |
| 7,113,913 B1 | 9/2006 | Davis et al. | |
| 7,120,601 B2 | 10/2006 | Chen et al. | |
| 7,143,051 B1 | 11/2006 | Hanby et al. | |
| 7,149,712 B2 | 12/2006 | Lang | |
| 7,249,030 B2 | 7/2007 | Sopko, III et al. | |
| 7,249,037 B2 | 7/2007 | Koppes et al. | |
| 7,249,077 B2 | 7/2007 | Williams et al. | |
| 7,251,623 B1 | 7/2007 | Ryan et al. | |
| 7,328,183 B1 | 2/2008 | Leisle | |
| 7,376,608 B1 | 5/2008 | Dellinger | |
| 7,392,202 B1 | 6/2008 | O'Brien | |
| 7,398,241 B2 | 7/2008 | Fay et al. | |
| 7,454,379 B1 * | 11/2008 | Wolzenski et al. | 705/37 |
| 7,590,583 B1 | 9/2009 | Ferguson et al. | |
| 7,613,644 B1 | 11/2009 | Abbs et al. | |
| 7,634,420 B2 * | 12/2009 | Kendall et al. | 705/4 |
| 7,640,202 B2 | 12/2009 | Foti et al. | |
| 7,653,560 B2 | 1/2010 | Hueler | |
| 7,676,414 B1 | 3/2010 | Abbs et al. | |
| 7,685,007 B1 | 3/2010 | Jacobson | |
| 7,685,056 B2 | 3/2010 | Menon | |
| 7,685,065 B2 * | 3/2010 | Weiss et al. | 705/39 |
| 7,689,644 B2 | 3/2010 | Teruyuki et al. | |
| 7,698,158 B1 | 4/2010 | Flagg | |
| 7,716,075 B1 | 5/2010 | Payne | |
| 7,769,664 B2 | 8/2010 | Egan | |
| 7,778,907 B1 | 8/2010 | Haskins et al. | |
| 7,778,908 B1 | 8/2010 | Grumet | |
| 7,797,174 B2 | 9/2010 | Samuels | |
| 7,801,792 B2 | 9/2010 | Tatro et al. | |
| 7,813,985 B2 | 10/2010 | O'Flinn et al. | |
| 7,840,470 B2 | 11/2010 | Robinson | |
| 7,840,471 B2 | 11/2010 | Foti et al. | |
| 7,853,460 B2 | 12/2010 | Ruark | |
| 7,877,306 B2 * | 1/2011 | Michalowski et al. | 705/35 |
| 7,877,307 B2 * | 1/2011 | Tatro et al. | 705/35 |
| 7,885,832 B2 | 2/2011 | Collins et al. | |
| 7,885,834 B2 * | 2/2011 | Weiss | 705/4 |
| 7,885,837 B1 | 2/2011 | Martin | |
| 7,890,402 B2 * | 2/2011 | Golembiewski | 705/35 |
| 7,945,513 B2 * | 5/2011 | Weiss et al. | 705/39 |
| 8,060,384 B2 | 11/2011 | Landry | |
| 8,060,387 B2 | 11/2011 | Landry | |
| 8,065,170 B2 | 11/2011 | Weiss | |
| 8,095,397 B2 | 1/2012 | Gray et al. | |
| 8,095,398 B2 | 1/2012 | Dellinger et al. | |
| 8,103,529 B1 | 1/2012 | Liebmann et al. | |
| 8,108,298 B2 | 1/2012 | Tatro et al. | |
| 8,108,308 B2 | 1/2012 | Buerger | |
| 8,112,345 B2 | 2/2012 | Mercier et al. | |
| 8,126,746 B2 | 2/2012 | Harris et al. | |
| 8,135,598 B2 | 3/2012 | Brown et al. | |
| 8,145,509 B2 | 3/2012 | Lange et al. | |
| 8,150,715 B1 | 4/2012 | Yee et al. | |
| 8,160,902 B2 | 4/2012 | Spalding, Jr. | |
| 8,160,946 B2 | 4/2012 | Roche et al. | |
| 8,165,902 B2 | 4/2012 | Chien et al. | |
| 8,175,900 B2 | 5/2012 | Danielsen | |
| 8,175,947 B2 | 5/2012 | Michalowski et al. | |
| 8,175,952 B2 | 5/2012 | Brooker et al. | |
| 8,175,971 B1 | 5/2012 | Landry | |
| 8,180,656 B2 | 5/2012 | Barron, Jr. et al. | |
| 8,185,417 B1 | 5/2012 | Brown et al. | |
| 8,204,767 B2 | 6/2012 | Dellinger et al. | |
| 8,204,816 B2 | 6/2012 | Brodsky et al. | |
| 8,209,197 B2 | 6/2012 | Tatro et al. | |
| 8,209,199 B1 | 6/2012 | Abbs et al. | |
| 8,224,673 B2 | 7/2012 | Michalowski et al. | |
| 8,266,055 B2 | 9/2012 | Weiss et al. | |
| 2001/0014873 A1 | 8/2001 | Henderson et al. | |
| 2001/0034619 A1 * | 10/2001 | Sherman | 705/4 |
| 2001/0037276 A1 | 11/2001 | Kelly et al. | |
| 2001/0049612 A1 | 12/2001 | Davis | |
| 2002/0029158 A1 * | 3/2002 | Wolff et al. | 705/4 |
| 2002/0035527 A1 | 3/2002 | Corrin | |
| 2002/0052764 A1 | 5/2002 | Banks | |
| 2002/0052784 A1 | 5/2002 | Sherwin | |
| 2002/0052818 A1 | 5/2002 | Loveland | |
| 2002/0059141 A1 | 5/2002 | Davies et al. | |
| 2002/0069090 A1 | 6/2002 | De Grosz et al. | |
| 2002/0077866 A1 | 6/2002 | Javerlhac | |
| 2002/0077868 A1 | 6/2002 | Javerlhac | |
| 2002/0087365 A1 | 7/2002 | Kavanaugh | |
| 2002/0091539 A1 | 7/2002 | Yin et al. | |
| 2002/0103678 A1 | 8/2002 | Burkhalter et al. | |
| 2002/0103679 A1 | 8/2002 | Burkhalter et al. | |
| 2002/0103733 A1 | 8/2002 | Barrington et al. | |
| 2002/0116311 A1 | 8/2002 | Chalke et al. | |
| 2002/0138386 A1 | 9/2002 | Maggioncalda et al. | |
| 2002/0165740 A1 | 11/2002 | Saunders | |
| 2002/0169715 A1 | 11/2002 | Ruth et al. | |
| 2002/0184129 A1 | 12/2002 | Arena et al. | |
| 2002/0188540 A1 | 12/2002 | Fay et al. | |
| 2002/0194098 A1 | 12/2002 | Stiff et al. | |
| 2002/0198802 A1 | 12/2002 | Koresko | |

(56) References Cited

U.S. PATENT DOCUMENTS

| | | |
|---|---|---|
| 2002/0198827 A1 | 12/2002 | Van Leeuwen |
| 2003/0004844 A1 | 1/2003 | Hueler |
| 2003/0014285 A1 | 1/2003 | Richard |
| 2003/0014345 A1 | 1/2003 | Lim |
| 2003/0018498 A1 | 1/2003 | Banks |
| 2003/0033172 A1* | 2/2003 | Menke ............... 705/4 |
| 2003/0055763 A1 | 3/2003 | Linnenbringer et al. |
| 2003/0065539 A1 | 4/2003 | Kay |
| 2003/0088430 A1 | 5/2003 | Ruark |
| 2003/0088512 A1 | 5/2003 | Hoter-Ishay |
| 2003/0093303 A1 | 5/2003 | Pooler |
| 2003/0125982 A1 | 7/2003 | Ginsberg |
| 2003/0135396 A1 | 7/2003 | Javerlhac |
| 2003/0167220 A1 | 9/2003 | Schoen et al. |
| 2003/0172018 A1 | 9/2003 | Chen et al. |
| 2003/0187764 A1 | 10/2003 | Abbs et al. |
| 2003/0191672 A1* | 10/2003 | Kendall et al. ............ 705/4 |
| 2003/0195827 A1 | 10/2003 | Lichtig |
| 2003/0233301 A1 | 12/2003 | Chen et al. |
| 2004/0078244 A1 | 4/2004 | Katcher |
| 2004/0088201 A1 | 5/2004 | Lang |
| 2004/0088236 A1 | 5/2004 | Manning |
| 2004/0093242 A1 | 5/2004 | Cadigan et al. |
| 2004/0107134 A1 | 6/2004 | Nelson |
| 2004/0111045 A1 | 6/2004 | Sullivan et al. |
| 2004/0117286 A1 | 6/2004 | Charnley, Jr. |
| 2004/0158517 A1 | 8/2004 | Mahaney et al. |
| 2004/0172350 A1 | 9/2004 | Atkinson et al. |
| 2004/0177022 A1 | 9/2004 | Williams et al. |
| 2004/0181436 A1 | 9/2004 | Lange |
| 2004/0199446 A1 | 10/2004 | Lange |
| 2004/0225536 A1 | 11/2004 | Schoen et al. |
| 2004/0249660 A1 | 12/2004 | Williams et al. |
| 2004/0267647 A1 | 12/2004 | Brisbois |
| 2005/0010453 A1 | 1/2005 | Terlizzi et al. |
| 2005/0015282 A1 | 1/2005 | Gutman et al. |
| 2005/0033611 A1 | 2/2005 | Phelps |
| 2005/0033612 A1 | 2/2005 | Donovan et al. |
| 2005/0038681 A1 | 2/2005 | Covert |
| 2005/0038682 A1 | 2/2005 | Gandee et al. |
| 2005/0060251 A1 | 3/2005 | Schwartz et al. |
| 2005/0071205 A1 | 3/2005 | Terlizzi et al. |
| 2005/0080739 A1 | 4/2005 | Sherzan et al. |
| 2005/0080741 A1 | 4/2005 | Sherzan |
| 2005/0086085 A1* | 4/2005 | Berlin et al. ............ 705/4 |
| 2005/0144124 A1 | 6/2005 | Stiff et al. |
| 2005/0149425 A1 | 7/2005 | Hagan |
| 2005/0154658 A1 | 7/2005 | Bove et al. |
| 2005/0177509 A1 | 8/2005 | Mahaney et al. |
| 2005/0187840 A1 | 8/2005 | Stiff et al. |
| 2005/0187869 A1 | 8/2005 | Buerger |
| 2005/0192849 A1* | 9/2005 | Spalding .................. 705/4 |
| 2005/0216316 A1 | 9/2005 | Brisbois et al. |
| 2005/0234747 A1 | 10/2005 | Kavanaugh |
| 2005/0234821 A1 | 10/2005 | Benham et al. |
| 2006/0026036 A1 | 2/2006 | Mahmood |
| 2006/0041453 A1 | 2/2006 | Clark et al. |
| 2006/0041455 A1* | 2/2006 | Dehais ..................... 705/4 |
| 2006/0059020 A1 | 3/2006 | Davidson |
| 2006/0080191 A1 | 4/2006 | Hinson |
| 2006/0085313 A1 | 4/2006 | Selby |
| 2006/0085338 A1 | 4/2006 | Stiff |
| 2006/0143055 A1 | 6/2006 | Loy et al. |
| 2006/0146951 A1 | 7/2006 | Chiu |
| 2006/0149651 A1 | 7/2006 | Robinson |
| 2006/0155631 A1 | 7/2006 | Kondaks |
| 2006/0161461 A1 | 7/2006 | Trani et al. |
| 2006/0206417 A1 | 9/2006 | Selby |
| 2006/0212380 A1 | 9/2006 | Williams et al. |
| 2006/0242052 A1 | 10/2006 | Long et al. |
| 2006/0271411 A1 | 11/2006 | Gregg et al. |
| 2007/0011089 A1 | 1/2007 | DeSchryver |
| 2007/0021986 A1 | 1/2007 | Cheung et al. |
| 2007/0033124 A1 | 2/2007 | Herr et al. |
| 2007/0038481 A1 | 2/2007 | Darr |
| 2007/0038487 A1 | 2/2007 | McCarthy |
| 2007/0050217 A1 | 3/2007 | Holden |
| 2007/0061238 A1 | 3/2007 | Merton et al. |
| 2007/0078690 A1 | 4/2007 | Kohl |
| 2007/0094053 A1 | 4/2007 | Samuels |
| 2007/0094054 A1 | 4/2007 | Crabb |
| 2007/0094125 A1 | 4/2007 | Izyayev |
| 2007/0094127 A1 | 4/2007 | Izyayev |
| 2007/0100720 A1 | 5/2007 | Bonvouloir |
| 2007/0100726 A1 | 5/2007 | O'Flinn et al. |
| 2007/0136164 A1 | 6/2007 | Roti et al. |
| 2007/0143199 A1 | 6/2007 | Stiff et al. |
| 2007/0162365 A1 | 7/2007 | Weinreb |
| 2007/0168235 A1 | 7/2007 | Livingston et al. |
| 2007/0185741 A1* | 8/2007 | Hebron et al. .............. 705/4 |
| 2007/0214022 A1 | 9/2007 | Hagelman, Jr. et al. |
| 2007/0214071 A1 | 9/2007 | Stone |
| 2007/0250427 A1 | 10/2007 | Robinson |
| 2008/0010095 A1 | 1/2008 | Joyce |
| 2008/0021744 A1 | 1/2008 | Walker et al. |
| 2008/0027762 A1 | 1/2008 | Herzfeld et al. |
| 2008/0071661 A1 | 3/2008 | Jeudy et al. |
| 2008/0077450 A1 | 3/2008 | Klippel |
| 2008/0082371 A1 | 4/2008 | Phillips |
| 2008/0103839 A1 | 5/2008 | O'Brien |
| 2008/0109263 A1* | 5/2008 | Clark et al. ............... 705/4 |
| 2008/0109341 A1 | 5/2008 | Stiff |
| 2008/0133280 A1 | 6/2008 | Ziegler |
| 2008/0154637 A1* | 6/2008 | Capelli et al. ............. 705/2 |
| 2008/0215376 A1 | 9/2008 | Engelman |
| 2008/0270194 A1 | 10/2008 | West et al. |
| 2008/0270195 A1 | 10/2008 | Gottlieb |
| 2008/0281761 A1 | 11/2008 | Egan |
| 2008/0288297 A1 | 11/2008 | Koo |
| 2009/0030735 A1* | 1/2009 | Tatro et al. ............... 705/4 |
| 2009/0030736 A1 | 1/2009 | Tatro et al. |
| 2009/0030737 A1* | 1/2009 | Weiss ..................... 705/4 |
| 2009/0030738 A1* | 1/2009 | Golembiewski ............ 705/4 |
| 2009/0030739 A1* | 1/2009 | Tatro et al. ............... 705/4 |
| 2009/0030740 A1 | 1/2009 | Robinson |
| 2009/0037231 A1 | 2/2009 | Menke |
| 2009/0063203 A1 | 3/2009 | Baiye |
| 2009/0089104 A1 | 4/2009 | Kondaks |
| 2009/0094069 A1 | 4/2009 | Castille et al. |
| 2009/0094070 A1 | 4/2009 | Harris et al. |
| 2009/0099979 A1 | 4/2009 | Raghavan et al. |
| 2009/0132300 A1 | 5/2009 | Weiss et al. |
| 2009/0132430 A1* | 5/2009 | Weiss ................... 705/36 R |
| 2009/0171831 A1 | 7/2009 | Johnson et al. |
| 2009/0192829 A1 | 7/2009 | Long et al. |
| 2009/0192830 A1 | 7/2009 | Shemtob |
| 2009/0271222 A1 | 10/2009 | Marks et al. |
| 2009/0307016 A1 | 12/2009 | Gray et al. |
| 2009/0319303 A1 | 12/2009 | Harkensee et al. |
| 2010/0030583 A1 | 2/2010 | Fievoli et al. |
| 2010/0030584 A1 | 2/2010 | Guilbert et al. |
| 2010/0070310 A1 | 3/2010 | Ferguson et al. |
| 2010/0076792 A1 | 3/2010 | Mule et al. |
| 2010/0088114 A1 | 4/2010 | Carstens |
| 2010/0106532 A1 | 4/2010 | Brown et al. |
| 2010/0121659 A1 | 5/2010 | Hueler |
| 2010/0125465 A1 | 5/2010 | Hueler |
| 2010/0131423 A1 | 5/2010 | Meyer et al. |
| 2010/0138245 A1 | 6/2010 | Baiye |
| 2010/0145735 A1 | 6/2010 | Kendall et al. |
| 2010/0169128 A1 | 7/2010 | Berlin et al. |
| 2010/0169129 A1 | 7/2010 | Kavanaugh |
| 2010/0174565 A1 | 7/2010 | Weiss et al. |
| 2010/0185468 A1 | 7/2010 | Methot |
| 2010/0256995 A1 | 10/2010 | Oliver |
| 2010/0299160 A1 | 11/2010 | Roscoe et al. |
| 2011/0035239 A1 | 2/2011 | Scheinerman et al. |
| 2011/0066453 A1 | 3/2011 | Tatro et al. |
| 2011/0231211 A1 | 9/2011 | Griffin |
| 2011/0238453 A1 | 9/2011 | Roche et al. |
| 2011/0246245 A1 | 10/2011 | Coleman |
| 2011/0251859 A1 | 10/2011 | McCullough et al. |
| 2011/0264473 A1 | 10/2011 | Abreu et al. |
| 2011/0270637 A1 | 11/2011 | Tatro et al. |

(56) References Cited

U.S. PATENT DOCUMENTS

| | | |
|---|---|---|
| 2011/0282696 A1 | 11/2011 | Weiss et al. |
| 2012/0022899 A1 | 1/2012 | Landry |
| 2012/0072245 A1 | 3/2012 | Schiminovich |
| 2012/0084104 A1 | 4/2012 | Harkensee et al. |
| 2012/0095785 A1 | 4/2012 | Gore et al. |
| 2012/0101857 A1 | 4/2012 | Harris et al. |
| 2012/0116822 A1 | 5/2012 | Vasavada et al. |
| 2012/0158435 A1 | 6/2012 | Sexauer et al. |
| 2012/0209629 A1 | 8/2012 | Gordon et al. |
| 2012/0209631 A1 | 8/2012 | Roscoe et al. |

FOREIGN PATENT DOCUMENTS

| | | |
|---|---|---|
| WO | WO 00/13118 | 3/2000 |
| WO | WO 00/14664 | 3/2000 |
| WO | WO 00/20512 | 3/2001 |
| WO | WO 00/88834 | 11/2001 |
| WO | WO 02/067096 | 8/2002 |
| WO | WO 2004/099943 | 11/2004 |
| WO | WO 2009/074878 | 6/2009 |

OTHER PUBLICATIONS

Rutherford, Dan Retirees Sue Metlife, Ex-Agent in Tulsa, Tulsa World Jun. 11, 1996 03:10 E.T.
Anonymous, Rep Spotlight: Buddy White NCB Central Carolina Bank, Grenville, SC; Stepping in where half a dozen previous reps had failed, White says he does more teaching than selling across a vast territory, Bank Investment Marketing, p. 14 Jan. 1, 2002.
Friedberg, Ruth, Area experts offer advice on making investments work Daily Breeze ( Cape Coral, FL, US) s A p. 5 Publication Date: Mar. 8, 1994.
Huntley, Helen, Compare split annuity's package deal to other investments Series: On Money; [South Pinellas Edition] St. Petersburg Times. St. Petersburg, Fla.: Dec. 29, 2002. p. 3.H.
Mason, Tom, Column, Fort Worth Star-Telegram, Texas, Oct. 20, 1998.
New York Life Introduces Lifestages® Elite Variable Annuity, New York Life, Oct. 1, 2003, 3 pages, http://www.newyorklife.com/cda/0,3254,12212,00.html.
New York Life Unveils Lifetime Income Product Featuring Liquidity, Inflation Protection, and Legacy Options, New York Life, 3 pages, http://www.newyorklife.com/cda/0,3254,12346,00.html, Aug. 30, 2003.
International Search Report dated May 4, 2004 for Application No. PCT/US03/05696.
Brown, et al., "Joint Life Annuities and Annuity Demand by Married Couples", Journal of Risk and Insurance, 67, 4, 527, Dec. 2000.
Financial Services Report, vol. 7, No. 10, May 9, 1990, Planco provides marketing services include colonial penn's popular annuity.
International Search Report dated Dec. 10, 2002 for Application No. PCT/US02/16471.
"New Variable Annuity Features Provide Value, but at a Cost", Located at http://www.insure.com/life/annuity/newerfeatures.html, Sep. 26, 2001.
Cybulski "Getting out of Your Annuity," located at http://www.insure.com/life/annuity/basics.html.
Cybulski "The Ups and Downs of Immediate Variable Annuities," located at http://www.insure.com/life/annuity/getout.html.
Cybulski, "The Basics of Annuities," located at http://www.insure.com/life/annuity/immediate.html, Dec. 18, 2007.
Prudential Introduces Income Bridge Approach to Retirement Planning, Business Wire, Mar. 15, 2004, 1 pg.
Prudential Retirement Expands Patent-Pending Income Bridge Approach(R) to Help Maximize Social Security Benefits to Retail Clients: New Report Unveiled on Helping to Maximize Social Security Benefits, Business Wire, 2006, 2 pgs.
Ibbotson Seeks Partnerships for Combined Fund, Annuity, Defined Contribution & Savings Plan Alert, Euromoney Institutional Investor PLC, Nov. 10, 2006, 1 pg.
Lincoln Financial Group Enhances Variable Annuity Option Lincoln SmartSecurity(SM) Advantage to Offers Guaranteed Lifetime Income for Both Investor and Spouse, PR Newswire Association LLC, Nov. 6, 2006, 3 pgs.
Lincoln Financial Group's i4LIFE® Advantage Reaches Milestone as Elections Cross $1.0 Billion in 2006 Sales; Straight Record-Breaking Quarter, PR Newswire Association LLC, Nov. 6, 2006, 3 pgs.
Prudential Responds to 'Retirement Revolution' with Innovative, Patent-Pending Guaranteed-Income Product, Business Wire, Dec. 13, 2006, 3 pgs.
Debaise, Insurers Add a Twist to Annuity Offerings, The Wall Street Journal. online (www.WSJ.com), Jan. 5, 2006, 4 pgs.
New York Life Brings Longevity Protection to Immediate Annuities: New Option Allows Clients to Customize retirement Payments According to Personal Needs and Life Events, Business Wire, Oct. 6, 2005, 2 pgs.
Lavine, New York Life Annuity Builds on Two Popular Features: Expects New Product to Attract $200 Million Within a Year, Annuity Market News, Thomson Media Inc. Feb. 1, 2005, 2 pgs.
American Express Financial Group Launches Annuities Feature Designed to Help Investors "Fight Off the Bears and Run With the Bulls", Business Wire, May 3, 2005, 2 pgs.
Golden Rule Insurance Company Receives Patent for Its Life/Long-Term Care Insurance Concept, PR Newswire, Jul. 15, 2003, 1 pg.
Hogan, 401(k) Provider Offers Guaranteed Income, www.ignites.com, Apr. 14, 2005, 2 pgs.
Tergesen, New Wrinkles for Annuities, BusinessWeek, Jul. 24, 2006, 4 pgs.
McEvoy, Replacing Insurance Policies Can Be Tricky, State Journal Register, Jan. 29, 1995, 2 pgs.
Fraser, Short Takes: Discover Brokerage Top 10 Stocks, American Broker, vol. 164 Issue 40 Mar. 1, 1999, 1 pg.
Smith et al., Annuity Tax and Planning Considerations, Journal of the American Society of CLU & ChFC, Bryn Mawr, vol. 46, Iss. 1, Jan. 1992.
Andrews, Listen Carefully and Sell More Annuities, Life & Health Insurance Sales, Indianapolis, vol. 140, Iss. 6, Nov./Dec. 1997.
Tregarthen, Double the Benefit with a Split Annuity, Life Association News, Washington, vol. 92, Iss. 9, Sep. 1997.
Feldstein et al., Accumulated Pension Collars: A Market Approach to Reducing the Risk of Investment-Based Social Security Reform, National Bureau of Economic Research Working Paper 7861, Aug. 2000.
www.annuityadvisors.com/FAQ/EquityIndexed.asp, Oct. 1, 2003.
Derivatives R US—Structured Notes, 1995.
U.S. Appl. No. 09/595,898, filed Jun. 20, 2000.
"TIAA-CREF Life Introduces Innovative Low-Cost Single Premium Immediate Annuity," Aug. 16, 2001.
Feldman, A. "Can This New 401(k) Save Retirement?," Business Week, Feb. 16, 2009.
"Which Types of Insurance Do You Actually Need?" www.thirdage.com, 2006.
Griffin, Mark E "The federal income taxation of annuities: A success story" May 1995 Journal of the American Society of CLU & ChFC v49n3 pp. 44-56.
Anonymous "The White House: Remarks by the President in Social Security Forum Town Hall meeting—Part 1 of 3" Jul. 28, 1998M2 Presswire , p. N/A.
Customer Action. Understanding Credit Card Costs. Dec. 27, 1996. p. 1-8. As viewed on May 4, 2011 at http://www.consumer-action.org/english/articles/understanding_credit_card_costs_tips_on_reducing_finance.

* cited by examiner

SYSTEMS AND METHODS FOR PROVIDING A CASH VALUE ADJUSTMENT TO A LIFE INSURANCE POLICY

This application claims priority to U.S. Provisional Patent Application 61/016,184 filed Dec. 21, 2007, the content of which is incorporated herein by reference in its entirety.

BACKGROUND OF THE INVENTION

Life insurance is typically in the form of a contract between an insurer and a policy owner. By the terms of the contract, the insurer agrees to pay a sum of money upon the death of the insured, i.e., the person whose life is insured. In return, the policy owner pays the insurer a premium. The premium is paid in a lump sum and/or is paid periodically at some interval. The policy owner and the insured may or may not be the same person.

Over the course of the term of a policy, the health of the insured person may well change. Some life insurance companies provide for such a change in health. For example, some life insurance companies offer acceleration of the death benefits for terminal illness and chronic illness and may permit the borrowing of amounts in excess of the cash value of the policy, on the basis of re-underwriting.

On the periphery of the life insurance industry, some companies also provide what has been characterized as a "life settlement." A life settlement is a mechanism by which a company (often a third party) offers a cash payment to a life insurance policy owner for an insured who has suffered a decline in health/life expectancy. The third party typically pays more to the policy owner than the cash value of the policy, i.e., the dollar amount that the insurer is contractually obligated to pay to the policy owner who surrenders his or her policy. That is, in a life settlement arrangement, the purchaser typically becomes the new owner and beneficiary and is responsible for future premium payments. Life settlements have shortcomings, including expenses associated with the life settlement transaction, inconsistency in the life settlement process, unavailability of partial life settlements, questions about insurable interests of the new owners, state law timing limitations and other shortcomings.

BRIEF SUMMARY OF THE INVENTION

The invention provides a method and system for performing a cash value adjustment of a life insurance policy. In particular, the invention provides a computer processing system for performing a cash value adjustment to a life insurance policy issued by an insurer and owned by a policy owner. The system may include a communication portion that inputs parameters of a life insurance policy, the parameters including controlling parameters. The controlling parameters might include (a) a constraint dictated parameter of the life insurance policy; and (b) a driven parameter of the life insurance policy. The system may further include a relationship processing portion that analyses the relationship between the constraint dictated parameter and the driven parameter. Further, the system may further include a re-underwriting analysis portion, the re-underwriting analysis portion performing a re-underwriting of the life insurance policy using the parameters of the life insurance policy and a set of re-underwriting criteria. The set of re-underwriting criteria may include a constraint relationship, the constraint relationship constituting a relationship, e.g. a legally mandated relationship, between certain of the parameters of the life insurance policy.

The re-underwriting analysis portion generates re-underwritten policy data to constitute a re-underwritten policy, the re-underwriting analysis portion using the re-underwritten policy data to adjust the constraint dictated parameter. Further, the relationship processing portion determines a magnitude of change, resulting from the re-underwriting, in the constraint dictated parameter. The system further includes a hypothetical cash value adjustment portion, the cash value adjustment portion performing an adjustment of the driven parameter based on the magnitude of change (before and after the re-underwriting) in the constraint dictated parameter. The adjustment is performed to maintain the relationship between the constraint dictated parameter and the driven parameter under a formula agreed upon by the life insurance policy insurer and the policy owner. In the invention, the communication portion outputs the re-underwritten policy data of the hypothetical re-underwritten policy along with the adjusted constraint dictated parameter and the adjusted driven parameter. The cash value adjustment portion may also determine an available amount, for withdrawal or borrowing, as well as the amount available to pay the premium for an annuity product.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of various embodiments of the invention will be described. As used herein, any term in the singular may be interpreted to be in the plural, and alternatively, any term in the plural may be interpreted to be in the singular.

As used herein, the invention will be described as a "cash value adjustment" feature provided with a life insurance policy. Further, as used herein, a life insurance policy, to which the invention applies, is a contract between an insurer and a policy owner in which the policy owner (or other entity) pays a premium (or premiums) to the insurer or an affiliate of the insurer, and in which the insurer or an affiliate pays monies upon due proof of the insured's death, wherein the life insurance policy may be associated with a cash value.

As used herein, the term "hypothetical" and variations thereof, means that analysis is performed to provide assessment of attributes of the insurance and allows offerings to be effected based on such assessments, in accord with the invention, but that the performance of such analysis, in and of itself, does not change the attributes of the life insurance policy. For example, the determination of the hypothetical change in the cost of the insurance, in the processing of the invention, provides assessment of the cost of the insurance and allows offerings to be effected under the invention, but in and of itself does not change the reality of what the cost of the insurance is.

As described above, some life insurance companies offer acceleration of the death benefits for terminal illness and chronic illness and may permit the borrowing of amounts in excess of the cash value on the basis of re-underwriting. However, it is not known in the art to offer a calculated enhancement of a cash surrender value, of a life insurance policy, through re-underwriting that is then used as the basis for providing an enhanced cash value that may either be withdrawn (without proof of terminal or chronic illness) or borrowed, or that is then used as the basis for providing a settlement annuity to replace the life policy.

As described above, life settlements have shortcomings. Life settlements offer cash payments to life insurance policy owners who have suffered a decline in health/life expectancy. Life settlements do not provide an option to the policy owner to retain coverage, while securing funds, or to exchange coverage for an annuity contract, i.e., life settlements do not provide desired options to the policy owner, i.e., the holder/owner of the policy, such desired options being to retain coverage on the insured's life, secure funds, and/or to receive the settlement proceeds in the form of installments paid by an insurance company under an immediate annuity contract. As used herein, an "immediate annuity" means an annuity where payments start within a year or approximately a year from issue, e.g. meaning that (a) if a monthly payment annuity, then payments start within the first 13 months of issuance, or (b) if a quarterly payment annuity, then payments start within the first year and quarter of issuance, for example. However, the invention is not limited to utilization of an immediate annuity, i.e., various other types of annuities may be utilized.

In accordance with one embodiment of the invention, the insurer, i.e., the entity that provided the life insurance policy, may offer and/or maintain an annuity of the invention, as described herein. However, alternatively some third party may offer and/or maintain such annuity.

As used herein, a "third party" means a party that is not commonly owned vis-à-vis some other party, such as an insurer, i.e., such that a further party X would be a third party vis-à-vis insurance company X if the further party X and the insurance company X were not commonly owned.

In accordance with one embodiment of the invention, the invention, i.e., innovation, provides a life insurance policy owner with the right to benefit from a pre-determined mathematical relationship between the cash value and the guaranteed cost of insurance rate (COI rate) by being re-underwritten post-issue upon request or at times specified in the policy, for example. In particular, the process of the invention may result in an increase in guaranteed COI rates leading to the hypothetical crediting of additional cash value to the policy, for example, upon a decline in the insured's health/life expectancy. The policy may also provide for a reduction in guaranteed COI rates, without adjustment to cash value, if the insured's health is found to be improved.

In one aspect, the innovation is intended to increase the liquidity provided by the insurer of a life insurance policy, beyond that available through cash surrenders or loans, and without resort to secondary markets. In one aspect, the innovation is intended to be a substitute for a "life settlement." In contrast to a life settlement, the innovation has generally lower transaction costs and greater flexibility in implementation.

The innovation may provide for the policy owner retaining life insurance coverage after cash values have been hypothetically increased through re-underwriting, but permits all or part of these values to be withdrawn at the direction of the policy owner. Thus, the policy owner who has suffered a decline in health (decline in life expectancy) has the ability to access the economic value of the policy without forfeiting rights to name the beneficiary of the policy's death benefit. Through partial surrenders or partial withdrawals, the policy owner may reduce the death benefit to the desired amount.

In addition, the innovation may provide for the policy owner obtaining an annuity payout based on cash values that have been hypothetically increased through re-underwriting. The innovation is an enhancement that can be applied to a wide variety of "life insurance policies" that can generate cash values. The invention may typically be applied to newly issued life insurance policies. However, the invention might also be applied to previously issued life insurance policies. For example, the cash value adjustment feature of the invention might be added on to an existing life insurance policy in some manner that is mutually acceptable to the insurer, the policy owner and that is legally acceptable, i.e., taking into account any applicable legal requirements, such as regulations.

To explain further, the innovation is a method, and system for performing the method, of doing life insurance business based on voluntary re-underwriting of the insured, upon request of the policy owner or at a specified time. The re-underwriting may be done in conjunction with the application of an actuarial formula based methodology. As a result, the re-underwriting may result in a hypothetical increase of the cash value of the policy, which in accordance with one embodiment of the invention is applied to an immediate annuity. In accordance with one embodiment of the invention, such an increase in the cash value of the policy would reflect a pre-determined relationship between the guaranteed cost of insurance rates (COI rates), the related net single premium (NSP), the cash value of the policy and/or other parameters associated with the life insurance policy. As used in this application, the term "NSP" means the net single premium (based on mortality, interest, and expense assumptions required by law, stated in the policy, or otherwise established by agreement between the insurer and policy owner) that is needed to fund future benefits under the life insurance policy, as such future benefits are defined by law, stated in the policy or otherwise defined by agreement between the insurer and policy owner. The formula might be applied only if the re-underwriting disclosed a deterioration in the insured's health sufficient to justify an increase in the COI rates. In accordance with one embodiment of the invention, any increased cash value, resulting in the re-underwriting, would be available for withdrawal or borrowing or could be left in the policy to support the new COI rate. In accordance with a further embodiment of the invention, any increased cash value, resulting in the re-underwriting, might be provided as funds available to the policy owner and/or might be provided to the policy owner as an immediate annuity. The immediate annuity may be the only option available if re-underwriting discloses that the insured is currently uninsurable. In that case, the highest COI rate offered by the insurance company would be insufficient to reflect the risk of continuing to cover the insured. Under one embodiment of the invention, The policyholder would then have the option to retain the unadjusted policy or exchange the policy for the an annuity, such as for example an immediate annuity.

It is understood that while the invention is described herein with reference to the technical term "net single premium (NSP)", the invention is certainly not limited to a life insurance policy having a single premium. Rather, a life insurance policy with the cash value adjustment feature, of the invention, may have multiple premiums associated with such policy. Indeed, the mechanics and number of the premium(s), and how the premium(s) is paid, may vary widely in practice of the invention.

Figure 1:
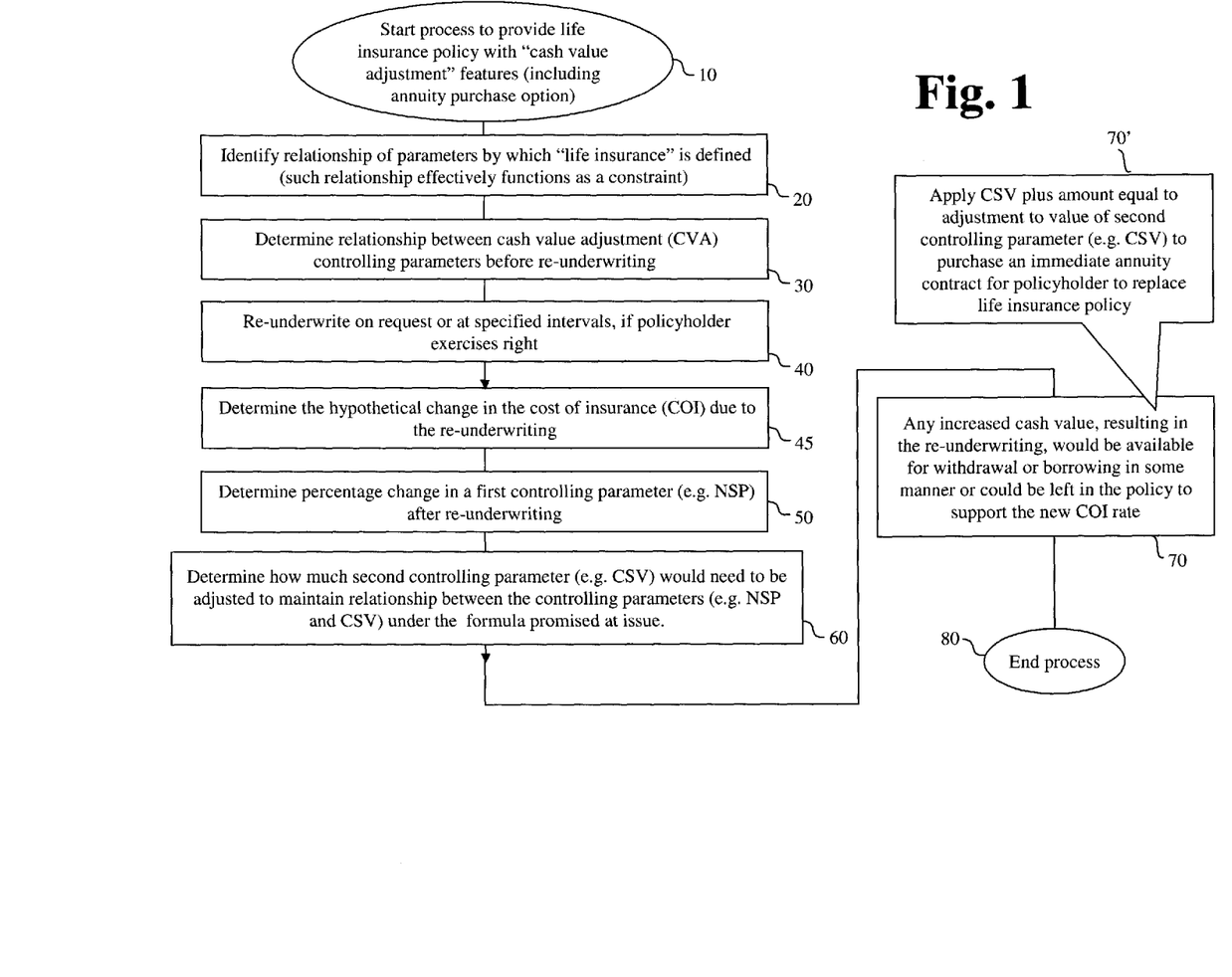
FIG. 1 is a high level flow chart showing a cash value adjustment methodology in accordance with one embodiment of the invention.

FIG. 1 is a high level flow chart showing a cash value adjustment methodology in accordance with one embodiment of the invention. As shown, the process of providing a life insurance policy with the cash value adjustment feature, of the invention, starts in step 10. As reflected in step 10, an annuity purchase option may be provided, as described below. After step 10, the process passes to step 20.

In step 20, the process identifies a relationship of parameters by which a "life insurance" policy is defined. Through the term of the life insurance policy (including any re-underwriting in accord with the present invention), this relationship effectively functions as a constraint. Accordingly, this relationship is herein characterized as a "constraint relationship." For example, the constraint relationship might define a required relationship between a cash surrender value of the life insurance policy vis-à-vis a single premium that would have to be paid at that time to fund future benefits under the life insurance policy. However, the constraint relationship might be defined in terms of other parameters associated with the life insurance policy. In FIG. 1, after step 20, the process passes to step 30.

In step 30, before a re-underwriting is performed, the process determines the relationship between what is herein characterized as "cash value adjustment controlling parameters" (i.e., "controlling parameters"). That is, as agreed upon (between the insurer, who may be the issuer, and the policy owner) at the issuance of the life insurance policy, the relationship between the controlling parameters that shall be maintained. In accordance with one embodiment of the invention, this relationship between the controlling parameters is defined by a formula, which is also agreed upon at issuance of the life insurance policy. It is appreciated that the particular parameters used as the controlling parameters, the particular relationship to be maintained between those controlling parameters and the particular formula to define such relationship, might well be varied. Such variance might depend on the particulars of the life insurance policy desired, the risk tolerances of the insurer and policy owner, and other criteria. For example, the controlling parameters might be (1) the cash surrender value (CSV) of the life insurance policy before the re-underwriting and (2) the net single premium (NSP) of the life insurance policy before the re-underwriting. After step 30, the process passes to step 40.

In step 40, the insurer re-underwrites the life insurance policy. This re-underwriting is done upon the request of the policy owner, and/or at a specified intervals, and is done assuming that the policy owner exercises the right to re-underwrite. If the policy owner opts to not exercise the right to re-underwrite, the life insurance policy would continue under the current terms, in accordance with one embodiment of the invention.

After step 40, the process passes to step 45. In step 45, the process determines the hypothetical change in the cost of the insurance (COI Rates). That is, changes in the parameters associated with the re-written life insurance policy, and in particular the mortality, will typically result in a change of the cost of the insurance. After step 45, the process passes to step 50.

In step 50, the process determines the change in one of the controlling parameters as a result of the re-underwriting. The change might be in the form of a percentage change, for example. Further, the new value of the controlling parameter in which the change is measured (e.g. a percentage change) might be dictated by both the new mortality (present upon the re-underwriting) and the constraint relationship. In accordance with one embodiment of the invention, this controlling parameter might be the net single premium (NSP) associated with the policy. This controlling parameter is described below as the "constraint dictated parameter."

Thereafter, as shown in FIG. 1, the process passes to step 60. In step 60, the process adjusts the second controlling parameter to adjust for the change in the first controlling parameter. This adjustment is performed so as to maintain the relationship between the first controlling parameter and the second controlling parameter (under the formula agreed to at the time of issuance of the original life insurance policy or the time post-issue that the cash value adjustment feature was added to the policy by rider). For example, the second controlling parameter might be the cash surrender value (CSV), and is further described below as the driven parameter. Accordingly, in one embodiment of the invention, in step 60, the process adjusts the second controlling parameter (e.g. CSV) to maintain the relationship between the controlling parameters (NSP and CSV) under the formula promised at issue of the life insurance. The formula might be dependent on a variety of factors, including the formula being related to the necessary future premiums before and after underwriting, as well as other parameters. For example, if the life expectancy has increased, then the CSV is not reduced.

Thereafter the process passes to step 70. As reflected in step 70, any increased cash value, resulting in the re-underwriting, would be available for withdrawal or borrowing in some manner or could be left in the policy to support the new COI rate.

After step 70, the process passes to step 80. In step 80, the process ends.

FIG. 1 also reflects an embodiment of the invention, as shown in step 70', in which the processing of step 70 is effected by utilizing an annuity. Specifically, in step 70' (of FIG. 1), the value determined in step 60 is applied to the purchase of a single premium immediate annuity contract, or some other annuity, in accordance with one embodiment of the invention. This contract might typically be period-certain only, although such might employ life contingencies, possibly including life contingencies reflecting underwriting for impaired risk. Further details of such utilization of an annuity are described below.

In accordance with one embodiment of the invention, the policy owner may, at a suitable point in the process (of exercising the cash value adjustment feature) be presented with an option to retain the policy in conjunction with withdrawing or borrowing the increased value (see FIG. 1, step 70); retain the policy in conjunction with securing an annuity with the increased value; replacing the policy with an annuity; or replacing the policy with some other form of payment; for example. Further, in accordance with one illustrative embodiment of the invention, using funds available to borrow or withdraw, i.e., an "available amount," an annuity might be secured at some later time, i.e., later as in some period of time after the exercise of the cash value adjustment feature.

Figure 2:
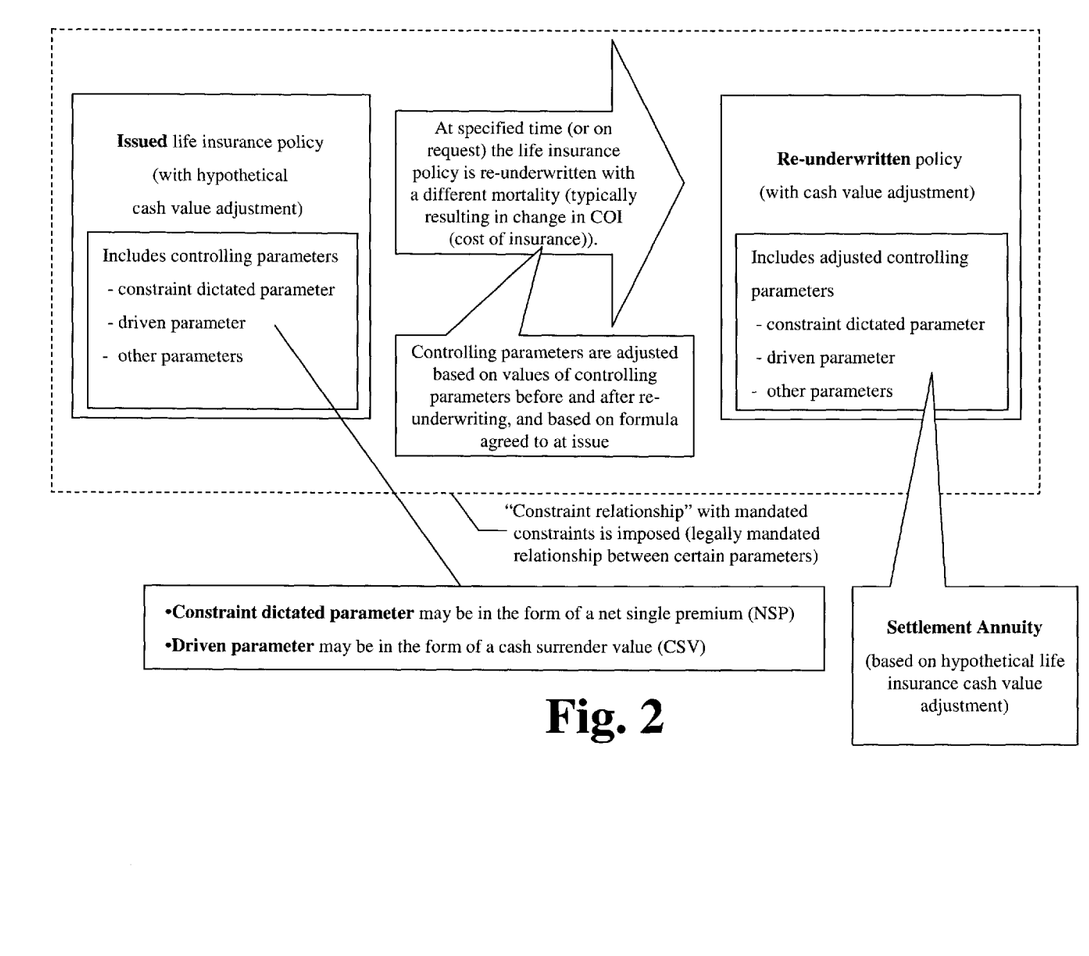
FIG. 2 is a diagram showing features of the cash value adjustment methodology in accordance with one embodiment of the invention.

FIG. 2 is a diagram showing high level features of the cash value adjustment methodology in accordance with one embodiment of the invention. As shown, the method includes issuing a life insurance policy with a hypothetical cash value adjustment feature. This issued life insurance policy includes various parameters, which define the terms of the policy. As characterized herein, some of these parameters are deemed to be controlling parameters. As shown (and described above), such controlling parameters include a constraint dictated parameter and a driven parameter, as well as other parameters.

As depicted in FIG. 2 (and described above with reference to FIG. 1) at a specified time or upon the request of the policy owner, the life insurance policy is submitted for re-underwriting (under the cash value adjustment feature). The controlling parameters (and the relationship there between) are determined before and after the re-underwriting. The variance (before and after re-underwriting) of the constraint dictated parameter is dictated by the constraint relationship. The constraint relationship is the legally mandated relationship between the parameters of the life insurance policy that must be present, so as to indeed be a life insurance policy. The constraint dictated parameter might be the NSP (net single premium) parameter of the policy.

On the other hand, the variance (before and after re-underwriting) of the driven parameter is dictated by both the change in the constraint dictated parameter, and the formula agreed upon at issuance or addition of the cash value adjustment feature to the policy. That is, such agreed upon formula goes to the contractually mandated relationship between the constraint dictated parameter and the driven parameter. However, such formula agreed to at issue of the life insurance policy, may indeed be based upon or tied into various parameters that may (or may not) change post issue, such as revised or new mortality tables, advances in disease treatment, and other parameters.

As reflected in FIG. 2, in accordance with one embodiment of the invention, an annuity contract may be purchased based upon the re-underwritten policy. The annuity might be purchased to replace the life insurance policy. Alternatively, the life insurance policy might be retained, in addition to purchasing an annuity (i.e., an annuity of lesser value than if the life insurance policy had been replaced). That is, an annuity might be secured using an increased value resulting from the re-underwriting. Alternatively, an available amount might be provided for borrowing or withdraw, in lieu of an annuity.

In accordance with some embodiments of the invention, the various processing of the invention, as described herein, need not be performed by a single entity. Indeed, portions of such various processing may be performed by different respective insurance companies and/or another third party entity. As described herein, in one embodiment, the cash value adjustment feature could be provided as a contractual arrangement afforded after the issuance of a life insurance policy. Relatedly, in accordance with one embodiment of the invention, the provision of the cash value adjustment feature might be provided by an entity other than the entity that originally issued the life insurance policy, i.e., other than the original insurer. For example, such another entity might buy an existing life insurance policy from an issuer/insurer, upon an agreement with the policy owner that the cash value adjustment feature would be provided in a replacement policy, and perhaps, that the cash value adjustment feature would be immediately exercised (so as to allow the policy owner to both retain their life insurance policy and secure liquidity, as described above). In that event the replacing insurer may retain the insured's original policy or obtain its settlement value from the original issuer (through reinsurance) or through some form of third party sale.

Further, a third party might propose the cash value adjustment feature to an insurer and policy owner, in conjunction with the understanding that the insurer would continue to insure the policy and that the policy owner would continue to own the policy. That is, such third party might act in the role of a broker of sorts to broker the deal, i.e., the deal of the cash value adjustment feature, between the insurer and the insured, i.e., the policy owner. Such third party might secure compensation for such brokering and for performing underwriting or other services.

In general it is appreciated that the different processing and/or portions of the invention, as described herein, may be performed by different entities. Such entities might coordinate in any of a variety of manners, along with the policy owner, such as under some agreement.

Figure 3:
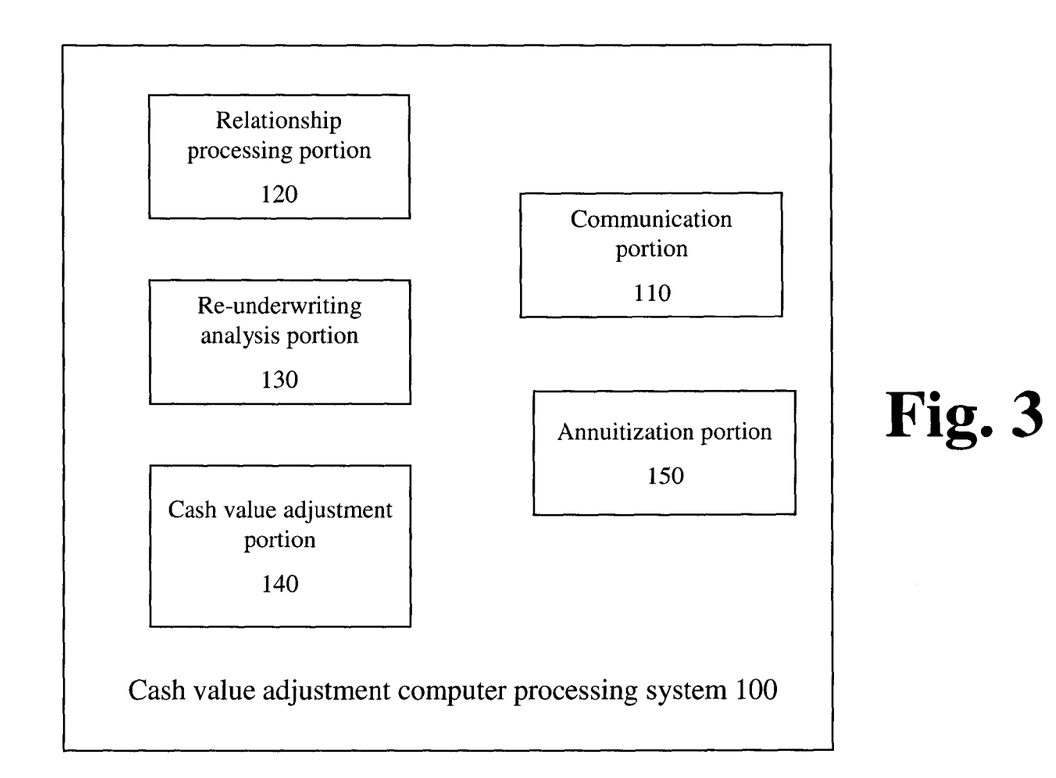
FIG. 3 is a block diagram operating system in accordance with one embodiment of the invention.

FIG. 3 is a block diagram showing a processing system to perform the cash value adjustment methodology, in accordance with one embodiment of the invention. Specifically, FIG. 3 illustrates a cash value adjustment computer processing system 100. The cash value adjustment computer processing system 100 performs the various processing done in conjunction with practice of the invention. In particular, the system 100 includes specialized processing portions as described below. The cash value adjustment computer processing system 100 generally performs processing not otherwise performed by the specialized processing portions.

The specialized processing portions in the system 100 include a communication portion 110, a relationship processing portion 120, a re-underwriting analysis portion 130, and a cash value adjustment portion 140. The computer processing system 100 performs a cash value adjustment to a life insurance policy issued by an insurer and owned by a policy owner, in accordance with one embodiment of the invention.

In operation, the communication portion 110 inputs parameters of a life insurance policy. The life insurance policy, of course, contains a variety of parameters that define the policy. In particular, these parameters of the policy include "controlling parameters." Such parameters are deemed controlling parameters in that they are, in particular, looked to in performing the cash value adjustment, in accord with the invention. In turn, and as described otherwise herein, these controlling parameters include (1) a constraint dictated parameter of the life insurance policy; and (2) a driven parameter of the life insurance policy.

The cash value adjustment computer processing system 100 includes the relationship processing portion 120. The relationship processing portion 120 analyses the relationship between the constraint dictated parameter and the driven parameter. Such analysis is performed by the relationship processing portion 120 both before and after a re-underwriting.

The re-underwriting analysis portion 130, in the system 100, performs a re-underwriting of the life insurance policy using the parameters of the life insurance policy and a suitable set of re-underwriting criteria. In particular, the set of re-underwriting criteria include the "constraint relationship" as described above. The constraint relationship constitutes a legally mandated relationship between certain of the parameters of the life insurance policy. The re-underwriting analysis portion generates re-underwritten policy data to constitute a re-underwritten policy.

As noted above, after the re-underwriting analysis portion 130 performs the re-underwriting, the relationship processing portion determines a magnitude of change, resulting from the re-underwriting, in the constraint dictated parameter. The constraint dictated parameter might be a net single premium (NSP) value associated with the policy.

The cash value adjustment portion 140 then performs an adjustment of the driven parameter based on the magnitude of change, before and after the re-underwriting, in the constraint dictated parameter (for example the percentage change in the NSP). This adjustment is performed so as to maintain the relationship between the constraint dictated parameter and the driven parameter under a formula agreed upon by the life insurance policy insurer and the policy owner. Further, in accordance with one embodiment of the invention, the cash value adjustment portion ascertains the amount, if any, that is available, e.g. such as for withdrawal or borrowing (i.e., the "available amount").

Further, the communication portion 110 outputs the re-underwritten policy data of the re-underwritten policy, along with the adjusted constraint dictated parameter and the adjusted driven parameter. In accordance with one embodiment of the invention, the communication portion 110 may also output the "available amount".

In accordance with one embodiment of the invention, the cash value adjustment computer processing system 100 includes an annuitization portion 150. The annuitization portion 150 processes the "available amount" to provide an annuity, i.e., an annuity contract, that is available to the policy owner. Such annuity may be the entirety of the available amount or a part of the available amount. For example, the available amount may be provided to fund a premium for an immediate annuity contract, or in some other way to set up funding for an annuity.

Figure 4:
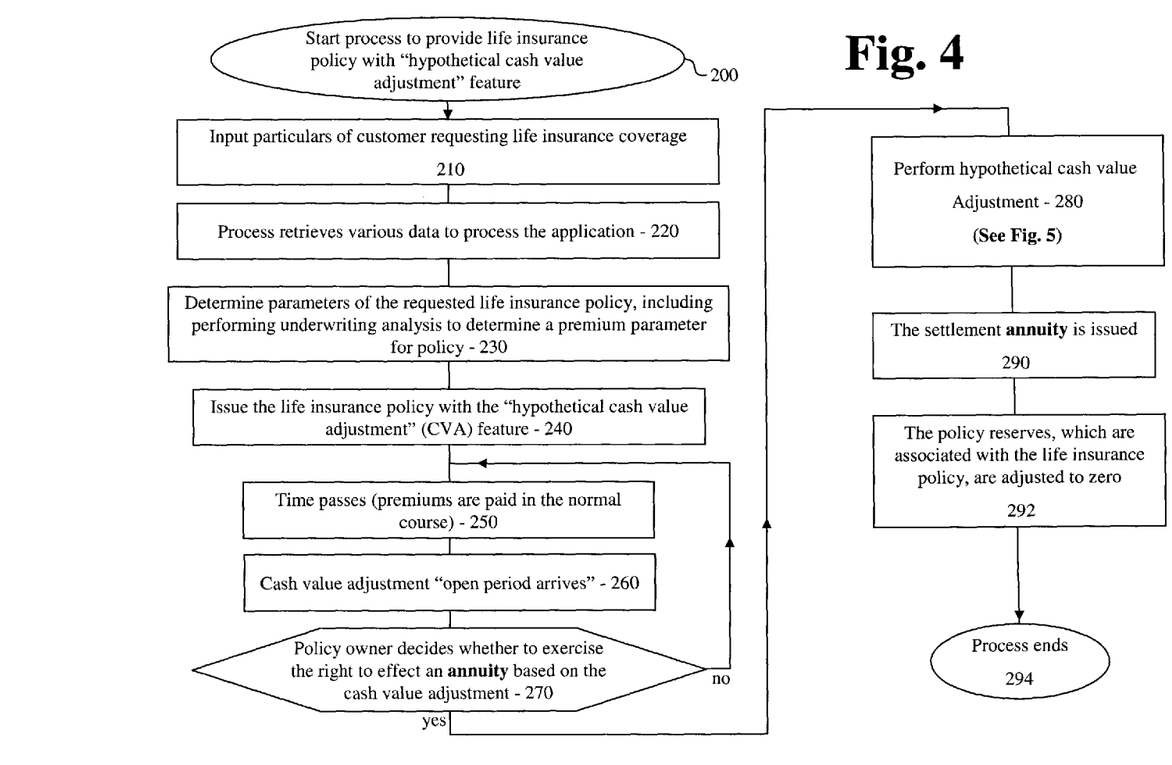
FIG. 4 is a further flowchart showing a process to provide life insurance policy with a "cash value adjustment" feature including an annuity in accordance with one embodiment of the invention.

FIG. 4 is a flowchart showing a process of issuance and re-underwriting of a life insurance policy with a cash value adjustment feature, in accordance with one embodiment of the invention. The processing of FIG. 4 might be performed, at least in part, by the cash value adjustment computer processing system 100 of FIG. 3, which may be in the form of a computer processing system that is specialized for insurance related processing. Alternatively, the process of FIG. 4 might be performed by another suitable processing system.

As shown in FIG. 4, the process starts in step 200 and passes to step 210. In step 210, the process inputs the particulars of a customer requesting life insurance coverage. These particulars might include age, health particulars, the amount of coverage desired, and related information. Then, the process passes to step 220.

In step 220, the process retrieves various data to process the application. Such data that is retrieved might include models, underwriting criteria, and other related data. After step 220, the process passes to step 230.

In step 230, the process determines parameters of the requested life insurance policy, including performing underwriting analysis to determine a premium parameter for policy. In conjunction with performing step 230, the process imposes "mandated constraints" such that the coverage indeed qualifies as "life insurance." Then, the process passes to step 240.

In step 240, the process issues the life insurance policy with a "cash value adjustment" (CVA) feature. The policy sets forth times, i.e., "adjustment open periods" at which the policy can be adjusted. Such timing may be based on a variety of factors. For example, the timing (at which an adjustment may be made) might be based on a time period from the issuance of the life insurance policy, the occurrence of a particular event, a particular time of year, the age of the policy owner, the age of the insured, or any other suitable time frame.

Further, the life insurance policy issued in step 240 sets forth an agreed upon relationship between the cash value adjustment "controlling parameters" of the policy. Such controlling parameters include a constraint dictated parameter and a driven parameter, e.g. the net single premium (NSP) and the cash surrender value (CSV), respectively, that is associated with the policy. This relationship between the controlling parameters may be defined in terms of a suitable formula. The formula may be based on a variety of parameters, as desired and as offered up by the insurer and agreed upon by the policy owner.

After step 240, the process passes to step 250. In step 250, a period of time passes. During this passing of time, the policy owner pays the requisite premiums. Then, the process passes to step 260.

Step 260 reflects that the cash value adjustment open period has arrived. Accordingly, under the terms of the cash value adjustment feature of the policy, the policy owner now has the opportunity to effect an annuity, in the embodiment of FIG. 4, based upon a hypothetical cash value adjustment.

Accordingly, in step 270, a decision is effected in which the policy owner decides whether to exercise the right to effect the annuity settlement option. If in step 270, the policy owner decides not to exercise the option, then the process returns to step 250 (and further time passes until a cash value adjustment open period is present again). On the other hand, if the policy owner decides to exercise the enhanced annuity settlement option in step 270, then the process passes to step 280.

It is appreciated that various further steps may be associated with an acceptance of the cash value adjustment feature. That is, in the case that a policy owner decides to exercise the cash value adjustment, in accordance with one embodiment of the invention, the insurer will determine the impact of the re-underwriting (including the financial ramifications to the policy owner). The policy owner might then be presented with the re-underwritten values. Thereafter, the policy owner would opt to accept or not accept such re-underwriting.

Returning to FIG. 4 (in the case that the policy owner has accepted), in step 280, processing is performed to effect the cash value adjustment processing. Further details of such processing are set forth below with reference to FIG. 5.

Figure 5:
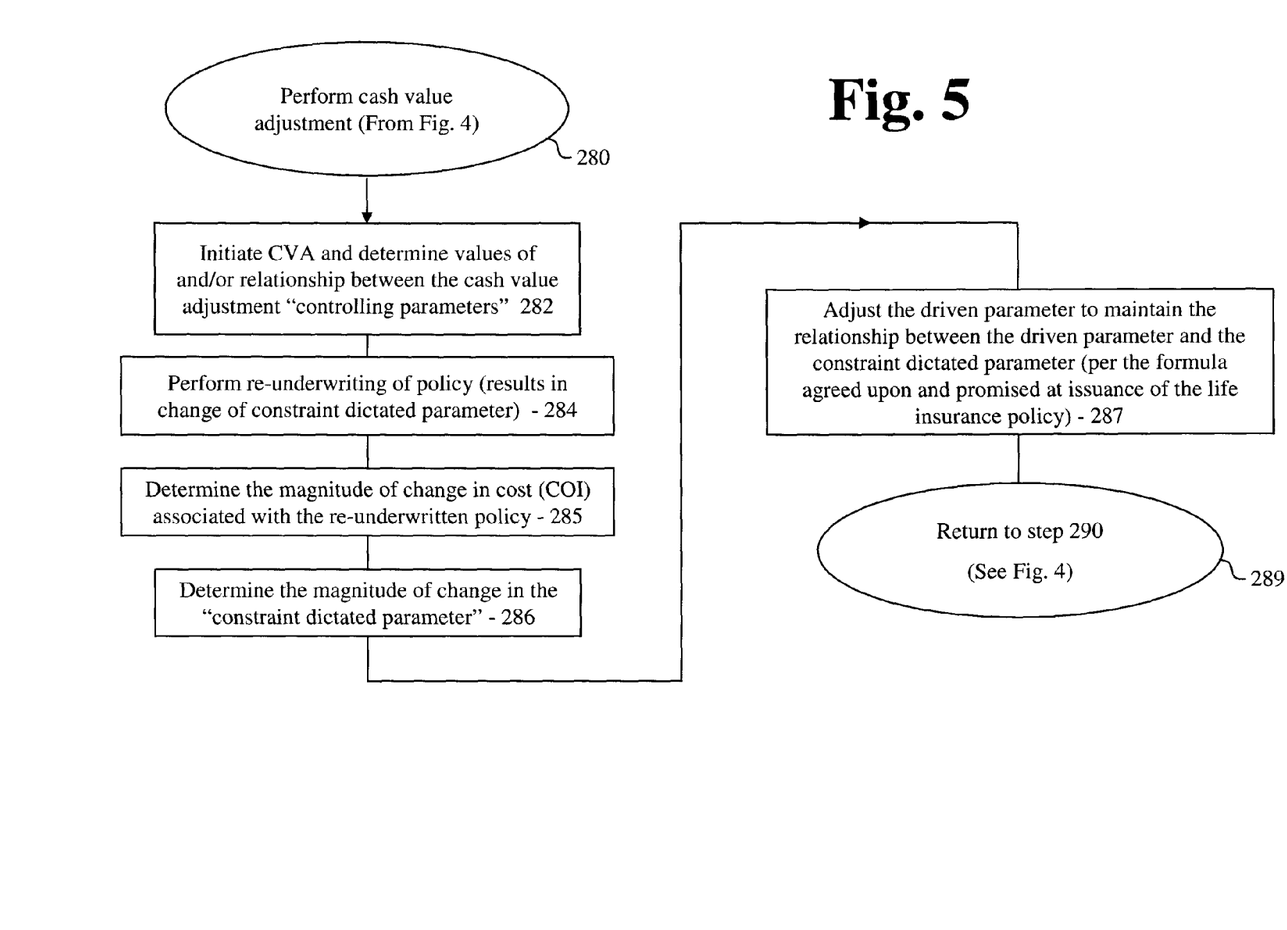
FIG. 5 is a flowchart showing further details of the "cash value adjustment processing" of FIG. 4 in accordance with one embodiment of the invention.

As shown in FIG. 5, the process starts in step 280, and passes to step 282. In step 282 of FIG. 5, the process initiates the cash value adjustment of the life insurance policy. In particular, in step 282 (of FIG. 5), the process determines values of and/or a relationship between the cash value adjustment controlling parameters. After this valuation is performed, the process passes to step 284.

In step 284, the process performs re-underwriting of the life insurance policy. That is, such re-underwriting is performed based on varied terms (varied vis-à-vis the original terms) and in particular a varied mortality. This re-underwriting is performed resulting in a change in value of the constraint dictated parameter (e.g. NSP), and while maintaining the applicable "mandated constraints." Of note, the value of the "constraint dictated parameter" may be controlled by the "mandated constraints" in conjunction with factoring in a variety of other parameters. After step 284, the process passes to step 285.

In step 285, the process determines the change in the cost (COI rates) of the re-underwritten life insurance policy. This change in rates may result from the change in the mortality parameter associated with the re-underwritten policy. After step 285, the process passes to step 286.

In step 286, the process determines the magnitude of change in the "constraint dictated parameter", i.e., such change resulting from the re-underwritten policy. This magnitude might be a percentage change in the net single premium (NSP) for example, in accordance with one embodiment of the invention. Then, the process passes to step 287.

In step 287, the process imposes the agreed upon required relationship between the controlling parameters. That is, the "constraint dictated parameter" is controlled by the re-underwriting. Given such constraint dictated parameter, in step 287, the process determines the "driven parameter" based on the "constraint dictated parameter." In other words, in step 287, the process adjusts the driven parameter to maintain the relationship between the driven parameter and the constraint dictated parameter (per the formula agreed upon and promised at issuance of the life insurance policy).

Such relationship between the driven parameter and the constraint dictated parameter may be determined in any of a variety of manners. Of course, however the relationship is to be defined, such relationship should be agreed upon by the parties. For example, the relationship (between the constraint dictated parameter and the driven parameter) might utilize: the magnitude of change in the constraint dictated parameter (upon re-underwriting); the values of the controlling parameters right before re-underwriting; the relative values of the controlling parameters; the change in values of the controlling parameter from the original issuance of the policy; or at some other suitable criteria.

After step 287 of FIG. 5, the process passes to step 289. In step 289, the process returns to step 290 of FIG. 4.

Accordingly, returning to the processing of FIG. 4 and step 290, in step 290, the annuity is issued based upon the re-underwritten policy and the policy owner is provided the annuity contract in the manner required by law. After step 290 of FIG. 4, the process passes to step 292 of FIG. 4.

In step 292 of FIG. 4, the policy reserves, which are associated with the life insurance policy, are adjusted to zero. After step 292, the process passes to step 294. In step 294 of FIG. 4, the process ends. Accordingly, an annuity has been exchanged for the life insurance policy.

Figure 6:
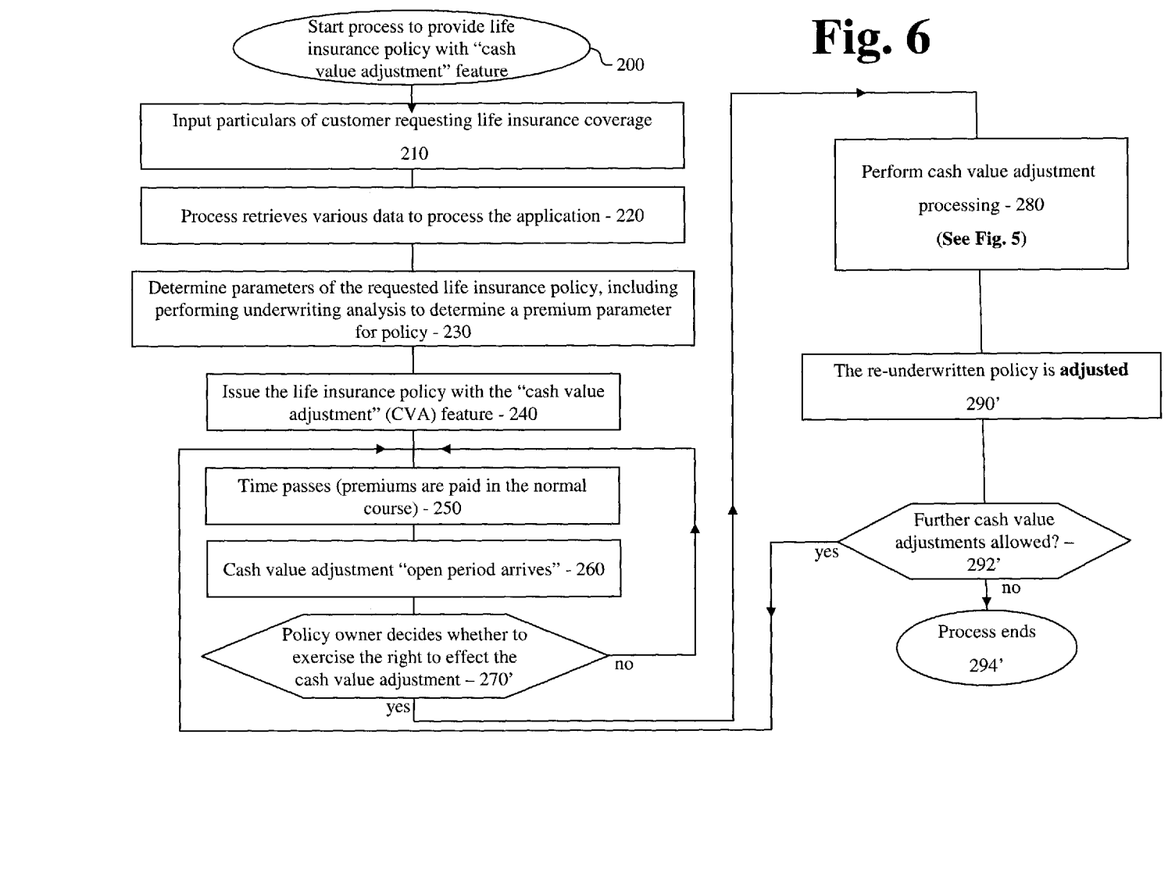
FIG. 6 is a further flowchart showing a process to provide life insurance policy with a "cash value adjustment" feature in accordance with one embodiment of the invention.

FIG. 6 is a flowchart, in accordance with one embodiment of the invention, showing (not specifically that an annuity is effected), but rather generally that the cash value adjustment feature was exercised with the potential in resulting in an available amount.

The processing of FIG. 6 is performed as described above with respect to FIG. 4, to the point that the process passes to step 270'.

As shown in the processing of FIG. 6, in step 270', a decision is effected in which the policy owner decides whether to exercise the right to effect the cash value adjustment. If in step 270, the policy owner decides not to exercise the option, then the process returns to step 250 (and further time passes until a cash value adjustment open period is present again). On the other hand, if the policy owner decides to exercise the cash value adjustment option in step 270', then the process passes to step 280'. Thus, as distinct from FIG. 4, in step 270' of FIG. 5, the policy owner does not decide whether to effect an annuity, but rather decides generally to exercise the cash value adjustment feature (which may entail an annuity in accordance with one embodiment of the invention).

Upon the process passing to step 280' of FIG. 6, processing is performed to effect the cash value adjustment processing. Further details of such processing are described above with reference to FIG. 5. After step 280 of FIG. 6, the process passes to step 290'.

In step 290', the re-underwritten policy is adjusted and the policy owner is provided the revised parameters, i.e., the updated policy reflecting the changes, in the manner required by law. After step 290', the process passes to step 292'.

In step 292', the terms of the life insurance policy may allow for further cash value adjustments at later times. If such is allowed, the process returns to step 250 of FIG. 4. Alternatively, the terms of the life insurance policy may not allow for further cash value adjustments at later times. As a result, the process passes to step 294'.

In step 294', the process of FIG. 6 ends.

As described above, the cash value adjustment feature is provided with a life insurance policy at the time of issuance of the policy. However, such is not needed in the practice of the invention. That is, the cash value adjustment feature could be provided as a contractual arrangement afforded after the issuance of a life insurance policy. Such contractual arrangement might be afforded by the insurer or a third party, i.e., other than the insurer.

With the systems and methods of embodiments as described above, it is appreciated that the driven parameter may well typically be in the form of a cash surrender value (CSV) or the like. However, alternatively, the driven parameter might take on a different or slightly different form, such as some value that is associated with or related to the cash surrender value (CSV).

In a similar vein, in systems and methods of embodiments as described herein, it is appreciated that the constraint dictated parameter may well typically be in the form of a net single premium (NSP), cash surrender value (CSV) or the like. However, alternatively, the constraint dictated parameter might take on a different or slightly different form, such as some value that is associated with or related to the net single premium (NSP).

Hereinafter, further aspects of implementation of the invention will be described. As described above, FIG. 3 shows an embodiment of a system of the invention. Further, FIGS. 1, 2 and 4-6 show various processing of embodiments of the invention.

The system, i.e., the computer processing system, of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

In particular, the processing machine as described herein may be in the form of a computer processing system, including one that is specialized for insurance related processing and/or specialized for underwriting related processing. Thus, such computer processing system that is specialized for insurance/underwriting related processing may be specifically provided to handle the various processing as described herein, i.e., specific computer code and memory stores, for example, may be provided to handle the processing as described herein As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBASE, Forth, FORTRAN, Java, Modula 2, PASCAL, PROLOG, REXX, VISUAL BASIC, and/or JAVASCRIPT, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A computer processing system that performs a cash value adjustment to a life insurance policy issued by an insurer and owned by a policy owner, the computer processing system comprising:
    a computer processor executing:
        a communication portion;
        a relationship processing portion;
        a re-underwriting analysis portion; and
        a cash value adjustment portion;
    the communication portion inputs parameters of a life insurance policy, the parameters including controlling parameters, and the controlling parameters including:
        a constraint dictated parameter of the life insurance policy; and
        a driven parameter of the life insurance policy;
    the relationship processing portion analyzes a relationship between the constraint dictated parameter and the driven parameter;
    the re-underwriting analysis portion performs a re-underwriting of the life insurance policy using the parameters of the life insurance policy and a set of re-underwriting criteria, the set of re-underwriting criteria including a constraint relationship, the constraint relationship constituting a relationship between certain of the parameters of the life insurance policy, the re-underwriting analysis portion generating re-underwritten policy data to constitute a re-underwritten policy;
    the relationship processing portion determining a magnitude of change, resulting from the re-underwriting, in the constraint dictated parameter;
    the cash value adjustment portion performs an adjustment of the driven parameter based on the magnitude of change, before and after the re-underwriting, in the constraint dictated parameter, the adjustment being performed to maintain the relationship between the constraint dictated parameter and the driven parameter under a formula agreed upon by the life insurance policy insurer and the policy owner; and
    the communication portion outputting the re-underwritten policy data of the re-underwritten policy along with the adjusted constraint dictated parameter and the adjusted driven parameter; and
    wherein the computer processing system is in a form of a computer processing system that processes insurance related information.

2. The system of claim 1, wherein the cash value adjustment portion uses a net single premium (NSP) as the constraint dictated parameter.

3. The system of claim 1, wherein the cash value adjustment portion uses a cash surrender value (CSV) as the driven parameter.

4. The system of claim 3, wherein the cash value adjustment portion uses a net single premium (NSP) as the constraint dictated parameter.

5. The system of claim 1, wherein the relationship processing portion determining a magnitude of change, resulting from the re-underwriting, in the constraint dictated parameter includes:
    determining a percentage change in the value of the constraint dictated parameter before the re-underwriting vis-à-vis a value of the constraint dictated parameter after the re-underwriting.

6. The system of claim 1, wherein the re-underwriting analysis portion further determines a change in cost of insurance (COI rates) that are associated with the re-underwritten life insurance policy.

7. The system of claim 1, wherein the cash value adjustment portion determines an available amount based on the driven parameter, and the communication portion outputs the available amount.

8. The system of claim 7, further including an annuitization portion, the annuitization portion determining, based on the amount available, an annuity product for the policy owner.

9. The system of claim 8, wherein the available amount is output by the communication portion in a form of the annuity product.

10. The system of claim 1, wherein the relationship is a legally mandated relationship.

11. The system of claim 1, wherein the relationship is a relationship agreed upon by the insurer and the policy owner.

12. A method to perform a cash value adjustment to a life insurance policy issued by an insurer and owned by a policy owner, the method performed by a computer processing system, the method comprising:

inputting parameters of a life insurance policy, by the computer processing system, the parameters including controlling parameters, and the controlling parameters including:
- a constraint dictated parameter of the life insurance policy; and
- a driven parameter of the life insurance policy;

the computer processing system analyzing a relationship between the constraint dictated parameter and the driven parameter;

the computer processing system performing a re-underwriting of the life insurance policy using the parameters of the life insurance policy and a set of re-underwriting criteria, the set of re-underwriting criteria including a constraint relationship, the constraint relationship constituting a relationship between certain of the parameters of the life insurance policy;

the computer processing system generating re-underwritten policy data to constitute a re-underwritten policy, in conjunction with using the re-underwritten policy data to adjust the constraint dictated parameter;

the computer processing system:
- determining a change in the constraint dictated parameter associated with the re-underwritten policy;
- determining a magnitude of change in the constraint dictated parameter;
- performing an adjustment of the driven parameter based on the magnitude of change, before and after the re-underwriting, in the constraint dictated parameter, the adjustment being performed to maintain the relationship between the constraint dictated parameter and the driven parameter under a formula agreed upon by the life insurance policy insurer and the policy owner; and
- determining an available amount, based on at least one of the controlling parameters; and outputting, by a communication portion, the available amount; and wherein the computer processing system is in a form of a computer processing system that processes insurance related information.

13. The method of claim 12, further including the communication portion also outputting the re-underwritten policy data of the re-underwritten policy along with the constraint dictated parameter as adjusted and the adjusted driven parameter.

14. The method of claim 12, wherein the computer processing system is maintained by the insurer of the life insurance policy.

15. The method of claim 12, wherein the computer processing system is maintained by a third party that is not the insurer of the life insurance policy.

16. The method of claim 12, wherein the computer processing system is maintained by a third party that is not the insurer of the life insurance policy, the computer processing system communicating with an insurer computer processing system, which is maintained by the insurer of the life insurance policy, so as to apply the method to the life insurance policy.

17. The method of claim 12, wherein the formula is agreed upon by the life insurance policy insurer and the policy owner after the issuance of the policy.

18. The method of claim 12, further including the computer processing system determining, based on the amount available, a premium for an annuity product for the policy owner.

19. The method of claim 18, wherein the available amount is output by the communication portion as the premium for the annuity product.

20. The method of claim 19, wherein the annuity is provided by a third party that is different than the insurer.

21. The method of claim 12, further including a third party, vis-à-vis the insurer, performing the method, the third party acquiring the life insurance policy from the insurer; and
wherein the life insurance policy, acquired by the third party, is insured by the third party, and in turn by the insurer through reinsurance, such reinsurance constituted by a policy from the insurer to the third party for the life insurance policy.

22. The method of claim 12, further including a third party, vis-à-vis the insurer, performing the method, the third party obtaining a settlement value from the insurer for the life insurance policy.

23. The method of claim 12, the life insurance policy constituting an existing life insurance policy; and
further comprising a third party, vis-à-vis the insurer, performing the method, the third party extending a further life insurance policy to the policy owner, and the third party retaining the existing life insurance policy, owned by the insurer, as insurance for the further life insurance policy.

24. The method of claim 12, wherein:
the constraint dictated parameter is constituted by a net single premium (NSP) value, and
the driven parameter is constituted by a cash surrender value (CSV).

25. A computer processing system to perform a cash value adjustment to a life insurance policy issued by an insurer and owned by a policy owner to effect a settlement option in a form of an annuity contract, the computer processing system comprising:
a computer processor executing:
- a communication portion;
- a relationship processing portion;
- a re-underwriting analysis portion;
- a cash value adjustment portion; and
- an annuitization portion;

the communication portion inputs parameters of a life insurance policy, the parameters including controlling parameters, and the controlling parameters including:
- a constraint dictated parameter of the life insurance policy; and
- a driven parameter of the life insurance policy;

the relationship processing portion analyzes a relationship between the constraint dictated parameter and the driven parameter;

the re-underwriting analysis portion performs a re-underwriting of the life insurance policy using the parameters of the life insurance policy and a set of re-underwriting criteria, the set of re-underwriting criteria including a constraint relationship, the constraint relationship constituting a relationship between certain of the parameters of the life insurance policy, the re-underwriting analysis portion generating re-underwritten policy data to constitute a re-underwritten policy, the re-underwriting analysis portion using the re-underwritten policy data to adjust the constraint dictated parameter so as to generate an adjusted constraint dictated parameter;

the relationship processing portion determining a magnitude of change, resulting from the re-underwriting, in the constraint dictated parameter;

the cash value adjustment portion performs an adjustment of the driven parameter based on the magnitude of change, before and after the re-underwriting, in the constraint dictated parameter, the adjustment being performed to maintain a mathematical relationship between the constraint dictated parameter and the driven parameter under a formula agreed upon by the life insurance policy insurer and the policy owner; and the communication portion outputting the re-underwritten policy data of the re-underwritten policy along with the adjusted constraint dictated parameter and the adjusted driven parameter; and the annuitization portion determines an adjusted cash value, based on such output, to determine a premium of an annuity contract.

26. The computer processing system of claim 25, wherein the annuity contract is a single premium immediate annuity contract.

* * * * *